(12) United States Patent
Drenckhahn et al.

(10) Patent No.: US 9,722,290 B2
(45) Date of Patent: Aug. 1, 2017

(54) ELECTRICAL ENERGY STORE

(71) Applicant: SIEMENS AKTIENGESELLSCHAFT, München (DE)

(72) Inventors: Wolfgang Drenckhahn, Erlangen (DE); Horst Greiner, Forchheim (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 240 days.

(21) Appl. No.: 14/411,348

(22) PCT Filed: May 27, 2013

(86) PCT No.: PCT/EP2013/060842
§ 371 (c)(1),
(2) Date: Dec. 24, 2014

(87) PCT Pub. No.: WO2014/001004
PCT Pub. Date: Jan. 3, 2014

(65) Prior Publication Data
US 2015/0340748 A1    Nov. 26, 2015

(30) Foreign Application Priority Data

Jun. 29, 2012 (DE) .................. 10 2012 211 318

(51) Int. Cl.
*H01M 12/08* (2006.01)
*H01M 12/02* (2006.01)
(Continued)

(52) U.S. Cl.
CPC .......... *H01M 12/08* (2013.01); *H01M 8/026* (2013.01); *H01M 8/0247* (2013.01); *H01M 12/02* (2013.01)

(58) Field of Classification Search
CPC ........ H01M 8/18; H01M 12/08; H01M 12/02; H01M 8/0247; H01M 8/026
See application file for complete search history.

(56) References Cited

U.S. PATENT DOCUMENTS 6,329,094 B1    12/2001    Yasuo et al.
6,649,297 B1    11/2003    Marchand et al.
(Continued)

FOREIGN PATENT DOCUMENTS

DE    199 58 405 A1    6/2001
DE    102008009377 A1    8/2009
(Continued)

OTHER PUBLICATIONS

Office Action for German Patent Appl. No. 102012211318.5 dated Feb. 21, 2013.
(Continued)

*Primary Examiner* — Emily Le
*Assistant Examiner* — Seenam Agbetiafan
(74) *Attorney, Agent, or Firm* — Slayden Grubert Beard PLLC

(57) ABSTRACT

A storage cell has an air electrode, connected to an air supply device, and a storage device. Channels for receiving a storage medium rest on the storage electrode. In addition, partition walls for partitioning off the channels with respect to one another are provided. The partition walls have a recess in the region of the storage electrode. This recess serves the purpose of spacing apart the storage medium from the storage electrode.

20 Claims, 4 Drawing Sheets

(51) Int. Cl.
*H01M 8/0247* (2016.01)
*H01M 8/026* (2016.01)

(56) References Cited

U.S. PATENT DOCUMENTS

| | | | |
|---|---|---|---|
| 2009/0023029 | A1 | 1/2009 | Matsumoto et al. |
| 2013/0034784 | A1 | 2/2013 | Landes et al. |
| 2013/0183595 | A1 | 7/2013 | Greiner et al. |

FOREIGN PATENT DOCUMENTS

| | | | |
|---|---|---|---|
| DE | 102009057720 A1 | 6/2011 | |
| DE | 102010041019 A1 | 3/2012 | |
| DE | 102012211318 | 6/2012 | |
| EP | 1 020 942 A1 | 7/2000 | |
| JP | 2003-100321 A1 | 4/2003 | |
| JP | 2010-102904 A1 | 5/2010 | |

OTHER PUBLICATIONS

International Search Report for PCT/EP2013/060842 mailed Oct. 24, 2013.

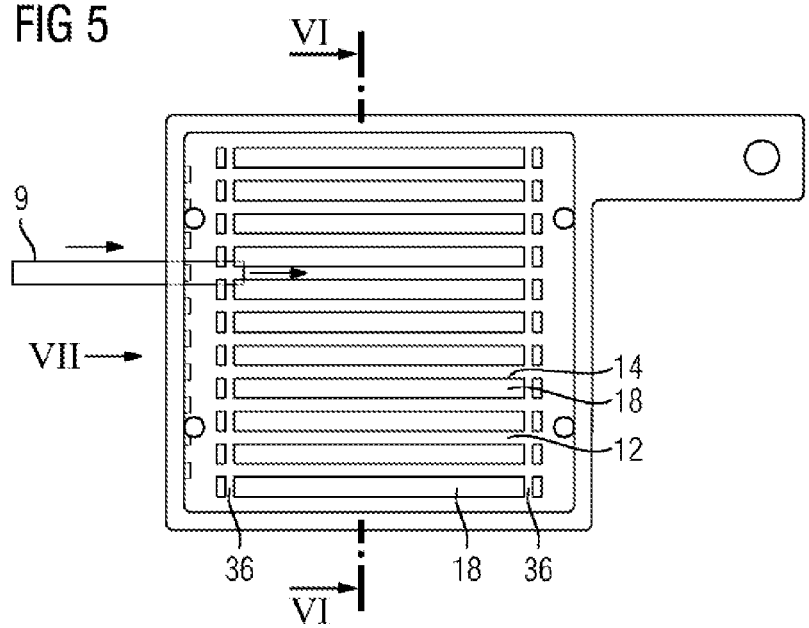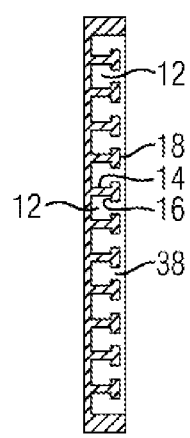

ELECTRICAL ENERGY STORE

CROSS REFERENCE TO RELATED APPLICATIONS

This application is the U.S. national stage of International Application No. PCT/EP2013/060842, filed May 27, 2013 and claims the benefit thereof. The International Application claims the benefit of German Application No. 102012211318.5 filed on Jun. 29, 2012, both applications are incorporated by reference herein in their entirety.

BACKGROUND

For the storage of excess electrical current, which occurs, for example, when current is generated by renewable energy sources or by power plants operated in the optimal efficiency range, and for which there is temporarily no demand in the network, various technical alternatives are adopted. One of these is the rechargeable metal air battery (rechargeable oxide battery, ROB). ROBs are usually operated at temperatures of between 600° C. and 800° C. In this case, oxygen, which is supplied at a (positive) air electrode of the electrical cell, is converted into oxygen ions, is transported through a solid electrolyte and is brought to the opposite negative electrode. A reaction with a gaseous redox pair takes place there, which absorbs or emits electrons, depending on the charging or discharging process, the oxygen absorbed or emitted by the gaseous redox pair being transferred by the diffusion of the components of the redox pair to a porous, that is to say gas-permeable, and likewise oxidizable and reducible storage medium. On account of the high temperatures required for this process, the choice of material for the cell materials used and the design of the cell parts and also the arrangement of the storage medium are highly complex. In particular, the individual components become impaired after several redox cycles which are run at the operating temperatures.

SUMMARY

Described below is an electrical energy store, based on an ROB, which, as compared with the prior art, ensures a cost-effective, simply assembled and temperature-resistant set-up of a stack or of a storage cell, and to make it possible to more accurately control the electrochemical procedures thereof.

The storage cell has an air electrode, which is connected to an air supply apparatus. Furthermore, the storage cell has a storage electrode, the storage electrodes being adjacent to ducts for receiving a storage medium. The storage cell of the energy store is wherein provision is made of partition walls, which serve to separate the ducts from one another. The intermediate spaces between the partition walls thus form the described ducts, the partition walls being configured in such a way that they have at least one undercut in the region of the storage electrode.

This undercut has the effect that a storage medium which is introduced into the ducts and which stores electrical energy as a result of chemical conversion processes, which will be explained in more detail, does not bear directly against the storage electrode. The undercuts clamp the storage elements firmly, with a gap through which a purge gas may flow being retained. This unhindered flow of a purge gas or of a gaseous redox pair which is used during operation of the storage cell and which produces an exchange of material between storage material and the storage electrode serves to always set the desired concentration of the purge gas or of the gaseous redox pair in the region between the storage electrode and the storage medium. The spacing between the storage medium and the storage electrode created by the undercuts makes it possible to better dose the chemical processes which proceed during operation of the storage cell and therefore to increase the efficiency of the storage cell.

In this respect, it has been found to be expedient if the undercuts of the partition walls have an L-shaped or T-shaped configuration.

Furthermore, it is expedient to arrange the duct-forming partition walls on what is termed an interconnector plate, the areal extent of which is configured in such a way that the ducts for receiving the storage medium are arranged on one side and air ducts for an air supply apparatus are applied in turn on the rear side thereof. This in turn leads to a compact design of the electrical energy store, and therefore a plurality of storage cells can be stacked one on top of another in the form of a stack.

In an advantageous embodiment, the partition walls are arranged perpendicularly on the interconnector plate. In this respect, they have in turn preferred end faces, which are plane-parallel with respect to the plane of the interconnector plate and against which an electrode structure, including at least the storage electrode, bears in a plane-parallel manner.

Furthermore, it is expedient if the ducts run parallel, this simplifying the process for producing the corresponding interconnector plate.

Moreover, it has been found to be expedient to insert a transverse groove at the ends of the parallel ducts, it being possible for a locking apparatus, for example in the form of a locking pin or a locking plate, to be introduced into the transverse groove in order to prevent longitudinal displacement of the storage medium in the duct.

BRIEF DESCRIPTION OF THE DRAWINGS

Further features and further advantageous embodiments are explained in more detail in the following description with reference to the accompanying drawings. These are merely exemplary embodiments which do not constitute any restriction of the scope of protection. In the drawings:

FIG. 5 is a plan view of a base plate according to FIG. 4, FIG. 6 is a cross section through the base plate according to FIG. 5 along the line VI, and FIG. 7 is a side view of the base plate according to FIG. 5 in the direction of the arrow VII.

DETAILED DESCRIPTION OF THE PREFERRED EMBODIMENT

Figure 1:
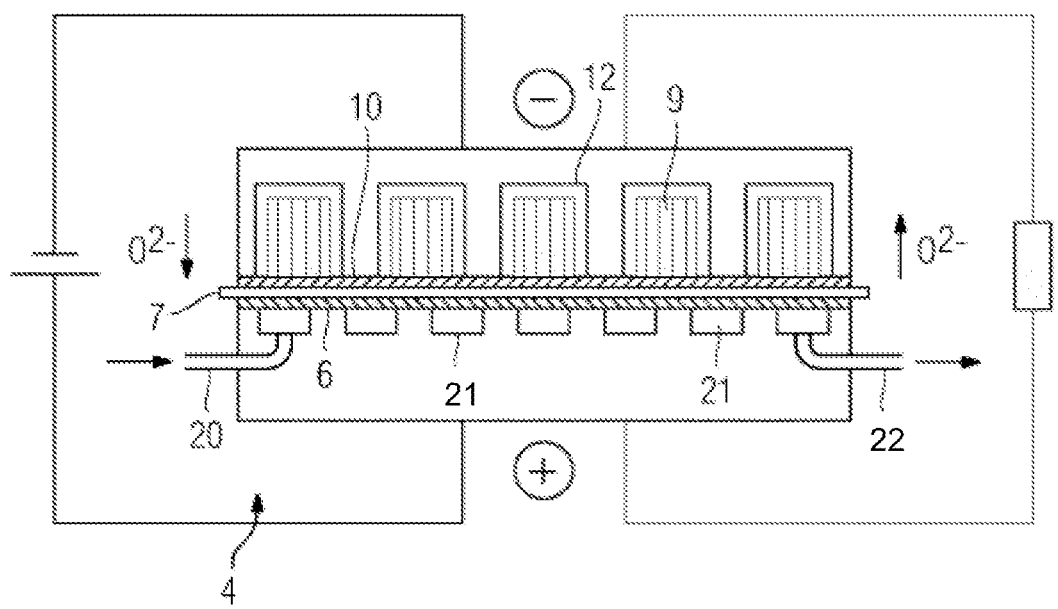
FIG. 1 is a schematic diagram of a cell of a rechargeable oxide battery.

Reference will now be made in detail to the preferred embodiments, examples of which are illustrated in the accompanying drawings, wherein like reference numerals refer to like elements throughout.

The mode of action of a rechargeable oxide battery (ROB) will first be described diagrammatically with reference to FIG. 1, in as much as this is necessary for the description below. In a known set-up of an ROB, a process gas, in particular air, is injected via a gas supply 20 and ducts 21 at a positive electrode 6, which is also designated as an air electrode, oxygen being extracted from the air during discharging (circuit on the right-hand side of the figure). The oxygen passes in the form of oxygen ions $O^{2-}$ through a solid electrolyte 7, bearing against the positive electrode, to a negative electrode 10. This is connected to the porous storage medium in the duct structure by way of a gaseous redox pair, e.g. a hydrogen/water vapor mixture. If a dense layer of the active storage material were present on the negative electrode 10, the charging capacity of the battery would quickly be exhausted.

For this reason, it is expedient to use on the negative electrode, as energy storage medium, a storage structure 9 which is composed of porous material and which contains a functionally acting oxidizable material as an active storage material, such as in the form of iron and iron oxide.

Via a redox pair, for example $H_2/H_2O$, which is gaseous in the operating state of the battery, after they have been discharged at the negative electrode the oxygen ions transported through the solid electrolyte 7 are transported in the form of water vapor through pore ducts in the porous storage structure 9, which includes the active storage material 9. Depending on whether there is a discharging or a charging operation, the metal or the metal oxide (iron/iron oxide) is oxidized or reduced, and the oxygen required for this purpose is delivered by the gaseous redox pair $H_2/H_2O$ or is transported back to the solid electrolyte. This mechanism of oxygen transport via a redox pair is designated as a shuttle mechanism.

The advantage of iron as oxidizable material, that is to say as active storage material 9, is that, during its oxidation process, it has approximately the same off-load voltage of about 1 V as the redox pair $H_2/H_2O$ in the case of a partial pressure ratio of 1, otherwise increased resistance arises to the transport of oxygen by the diffusing components of this redox pair.

The diffusion of the oxygen ions through the solid electrolyte 7 requires a high operating temperature of 600 to 800° C. of the ROB described, but this temperature range is also advantageous for the optimum composition of the redox pair $H_2/H_2O$ in equilibrium with the storage material. In this respect, it is not only the structure of the electrodes 6 and 10 and of the electrolyte 7 which is exposed to high thermal loading, but also the storage structure 9, which includes the active storage material. During the continuous cycles of oxidation and reduction, the active storage material tends to sinter, that is to say that the individual grains increasingly fuse together through diffusion processes, the reactive surface is reduced and the continuously open pore structure required for the gas transport disappears. In the case of a closed pore structure, the redox pair $H_2/H_2O$ can no longer reach the active surface of the active storage material 6, and therefore the internal resistance of the battery becomes very high already after partial discharge of the store, preventing a further technically expedient discharge.

One advantage of the ROB is that it can be extended to a virtually unlimited extent in modular form by its smallest unit, to be precise the storage cell. A small battery for stationary domestic use and a large-scale plant for storing the energy of a power station can thus be produced.

Figure 2:
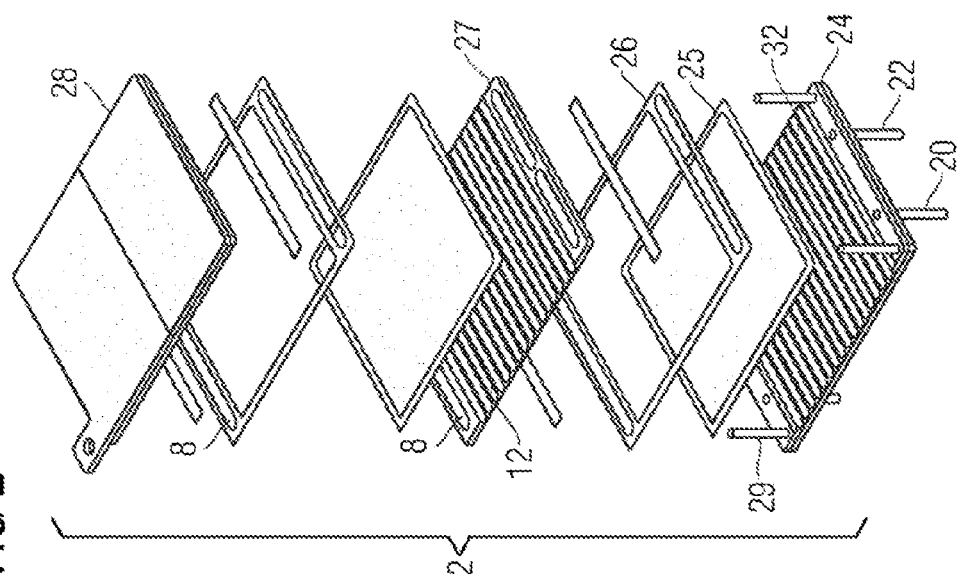
FIG. 2 is an exploded perspective view of a stack, seen from above.

A plurality of the storage cells 4 described in FIG. 1 are combined into what is known as a stack 2. The set-up of a stack 2 and the arrangement of the storage cells 4 in the stack 2 are made clear by the exploded illustrations in FIGS. 2 and 3. FIG. 2 illustrates the set-up of a stack which is seen from above and in this case is assembled in the order from the bottom upward. The stack 2 includes in the first place a base plate 24 which, if appropriate, is assembled from a plurality of individual plates which, in turn, have functional structurings and depressions, for example, for the routing of air. This assemblage of individual plates, which is not described in any more detail here, to form the base plate 24 is carried out, for example, by a brazing method.

The base plate 24 has an air supply 20 and an air discharge 22. As already described, ducts (not shown here) for air supply are integrated in the base plate 24 as a result of the assemblage of individual plates. Furthermore, the base plate 24 has centering bolts 29, by which further components of the stack 2 can then be attached in a centered manner. The next layer which follows is an electrode structure 25 which, in particular, includes the already described positive electrode 6, the solid electrolyte 7 and the storage electrode 10. This is a self-supporting ceramic structure, to which the individual functional regions, such as the electrodes and solid electrolyte, are attached by a thin-film method.

A further layer which follows is a seal 26 which is composed, for example, of a glass frit which is resistant to high temperature and which seals off the individual plates of the stack 2 when the battery is at the operating temperature. The next following plate is what is known as an interconnector plate 27, which has two functionally acting sides. On its lower side 34, as seen with respect to FIG. 2, are located the air supply ducts (not illustrated in any more detail here), which are adjacent to the positive electrode 6 of a storage cell 4. On its top side (store side 32), the interconnector plate 27 has ducts 12 into which the storage medium 9 is introduced. The top side of the interconnector plate 27 in FIG. 2 has the same structure as the top side of the base plate 24. Here, too, the ducts 12 for introducing the storage medium 9 are provided. This side having the ducts 12 in each case faces the storage electrode 10 of the storage cell 4.

FIG. 2 illustrates by way of example a further level of the sequence of an electrode structure 25 and a seal 26 under a closing plate 28, to form the overall set-up of the stack 2. In principle, of course, a series of further levels of these structural parts may also follow, so that a stack usually has between 10 and more layers of storage cells 4.

Figure 3:
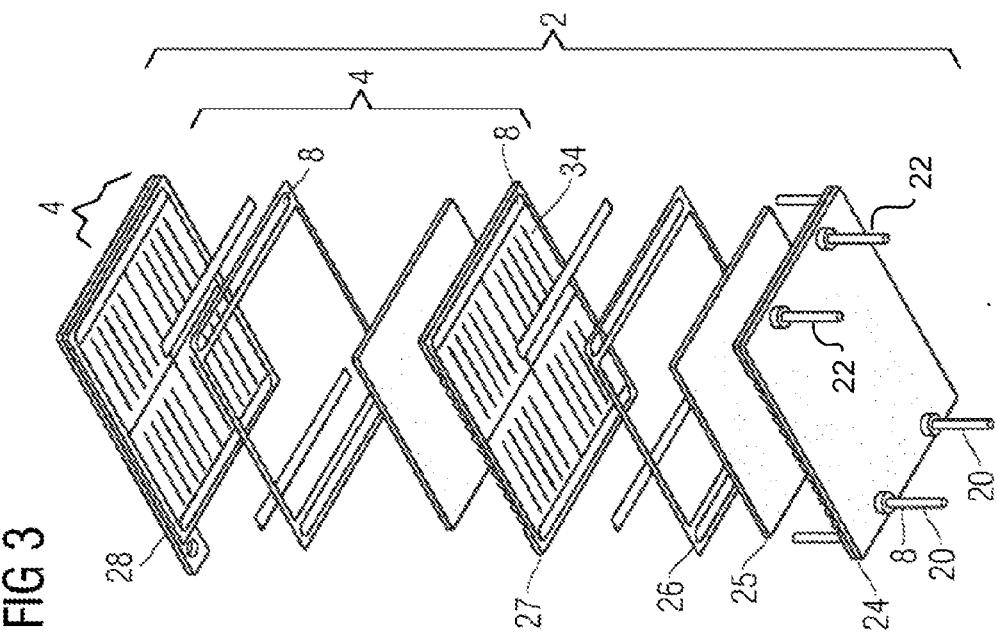
FIG. 3 is an exploded perspective view of the stack from FIG. 2, seen from below.

FIG. 3 illustrates the same stack 2, which is described in FIG. 2, in the opposite viewing direction. In FIG. 3, the view is of the base plate 24 from below, followed, in turn, by the electrode structure 25 and the seal 26. The interconnector plate 27 can then likewise be seen from below, the view in this case being directed toward the air side 34 which faces the air electrode (air side 34). In this example, four separate regions are illustrated on the interconnector plate on the air side 34 and correspond to a subdivision into four individual storage cells 4 per stack level (although this subdivision into four storage cells must be considered as being purely by way of example). In this example, therefore, the storage cell 4 is composed of a quarter of the area of the respective interconnector plate or base plate 24 or cover plate 28. Furthermore, the respective cell 4 is formed by a sequence of the respective air side 34, seal 26, electrode structure 25 and again in each case a quarter of the storage side 32 of the base plate 24 or interconnector plate 27. The air side 34 is in this case supplied with air as process gas by a stack-internal air distribution apparatus 8 (also called a manifold) which is not illustrated in any more detail here and has a plurality of levels of the stack.

Figure 4:
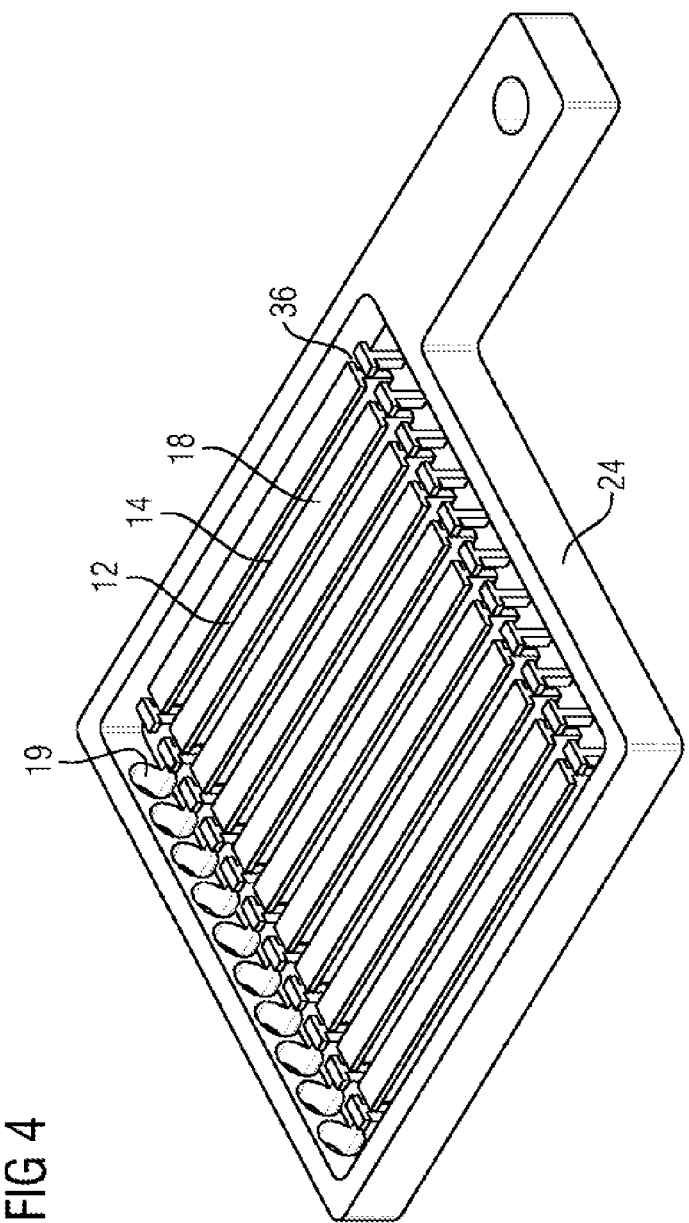
FIG. 4 is a three-dimensional perspective view of a base plate of a stack with T-shaped partition walls between the ducts.

FIG. 4 shows a three-dimensional illustration of a base plate 24, in which the structure of the partition walls 14, which form the ducts 12, is illustrated in more detail, indcluding transverse grooves 36. The partition walls 14 here have a characteristic T-shaped structure, as is shown more clearly in the cross-sectional illustration in FIG. 6, which shows a cross section along the line VI shown in FIG. 5.

FIG. 5 also shows boreholes 19, which serve on the one hand for equipping the ducts 12 with the storage medium 9, as is shown diagrammatically in the plan view of the base plate 24 in FIG. 5. The undercuts 16 on the partition walls 14, which in this present example have a T-shaped configuration, serve for introducing the storage medium consistently into the ducts 12. The storage medium 9 is therefore spaced apart from the storage electrode 10 bearing against end faces 18 of the partition walls 14 by the undercuts 16. A further duct 38 is thus formed, having the height of the undercuts 16 and being arranged between the duct 12 and the storage electrode 10. The cross-sectional geometry of this duct 38 is configured in such a way that sufficient shuttle gas $H_2O/H_2$ can always be introduced between the storage medium 9 and the storage electrode 10. This shuttle gas may be introduced through the boreholes 19 into the storage cell 4. Furthermore, a purge gas, for example nitrogen, can also be conducted through the ducts 38 in preparation for the operation of the storage cell 4 or of the energy store.

The ducts 38 therefore serve for constantly keeping sufficient shuttle gas ready in the region of the storage medium and for controlling the concentration of the gas for optimum electrochemical operation of the energy store.

The described T-shaped or else L-shaped profiles of the partition walls 14 can be produced comparatively easily in manufacturing terms by a stepped end milling cutter. The illustrated duct structure or partition wall structure of the base plate or in an analogous configuration on an interconnector plate 27 can therefore be produced by a favorable procedure.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. An electrical energy store connected to an air supply apparatus and receiving a storage medium, comprising:
    a storage cell, including an air electrode connected to the air supply apparatus;
    partition walls defining a plurality of ducts including channels closed on three sides having one open side, the ducts receiving the storage medium; and
    a storage electrode adjacent to the ducts and receiving the storage medium via the ducts;
    wherein the partition walls provide an undercut on the one open side of a respective duct in a region of the storage electrode.

2. The energy store as claimed in claim 1, wherein the partition walls have a cross section with a vertical wall section extending in a first axis and a horizontal wall section extending from one end of the vertical wall section at a right angle from the first axis.

3. The energy store as claimed in claim 2, further comprising an interconnector plate having a first side on which the partition walls are arranged and a second side on which air ducts of another storage cell are located.

4. The energy store as claimed in claim 3, wherein the partition walls run perpendicularly on the interconnector plate.

5. The energy store as claimed in claim 4, wherein the storage electrode bears against end faces of the partition walls in a plane-parallel manner.

6. The energy store as claimed in claim 5, wherein the ducts run in parallel.

7. The energy store as claimed in claim 6, wherein the partition walls include a transverse groove delimiting the ducts.

8. The energy store as claimed in claim 4, wherein the ducts run in parallel.

9. The energy store as claimed in claim 8, wherein the partition walls include a transverse groove delimiting the ducts.

10. The energy store as claimed in claim 3, wherein the storage electrode bears against end faces of the partition walls in a plane-parallel manner.

11. The energy store as claimed in claim 10, wherein the ducts run in parallel.

12. The energy store as claimed in claim 11, wherein the partition walls include a transverse groove delimiting the ducts.

13. The energy store as claimed in claim 3, wherein the ducts run in parallel.

14. The energy store as claimed in claim 13, wherein the partition walls include a transverse groove delimiting the ducts.

15. The energy store as claimed in claim 1, further comprising an interconnector plate having a first side on which the partition walls are arranged and a second side on which air ducts of another storage cell are located.

16. The energy store as claimed in claim 15, wherein the partition walls run perpendicularly on the interconnector plate.

17. The energy store as claimed in claim 16, wherein the storage electrode bears against end faces of the partition walls in a plane-parallel manner.

18. The energy store as claimed in claim 17, wherein the ducts run in parallel.

19. The energy store as claimed in claim 18, wherein the partition walls include a transverse groove delimiting the ducts.

20. The energy store as claimed in claim 1, wherein the ducts run in parallel and the partition walls include a transverse groove delimiting the ducts.

* * * * *